United States Patent [19]

Pitel et al.

[11] Patent Number: 4,568,826
[45] Date of Patent: Feb. 4, 1986

[54] AMBIENT LIGHTING DETECTION MECHANISM

[75] Inventors: Ira J. Pitel, Morristown; Edwin C. Read, Flemington; M'hamed Benouar, Lake Hiawatha, all of N.J.

[73] Assignee: Cornell-Dubilier Electronics, Inc., Wayne, N.J.

[21] Appl. No.: 494,406

[22] Filed: May 13, 1983

[51] Int. Cl.⁴ ............................................. H01J 3/14
[52] U.S. Cl. .................................. 250/237 R; 250/239
[58] Field of Search ................... 250/216, 239, 237 R, 250/205, 214 AL, 206, 208; 315/149, 155–159

[56] References Cited

U.S. PATENT DOCUMENTS

| | | | |
|---|---|---|---|
| 2,756,349 | 7/1956 | Frank | 250/239 |
| 3,225,187 | 12/1965 | Curtin | 250/239 |
| 3,289,005 | 11/1966 | Prescott et al. | 250/239 |
| 3,408,501 | 10/1968 | Thompson | 250/239 |
| 3,584,228 | 6/1971 | Kenyon et al. | 250/239 |
| 4,023,035 | 5/1977 | Rodriguez | 250/239 |
| 4,359,636 | 11/1982 | Stauffer | 250/239 |

*Primary Examiner*—David C. Nelms
*Attorney, Agent, or Firm*—Ronald R. Stanley

[57] ABSTRACT

A mounting arrangement for a photocell is disclosed which allows detection of ambient lighting. A collar is secured to a mounting surface by an integral flange and a locking collar. The photocell is fixed within a body member slidingly positioned within the collar. An adjustable aperture in the body member allows ambient light to be detected.

4 Claims, 10 Drawing Figures

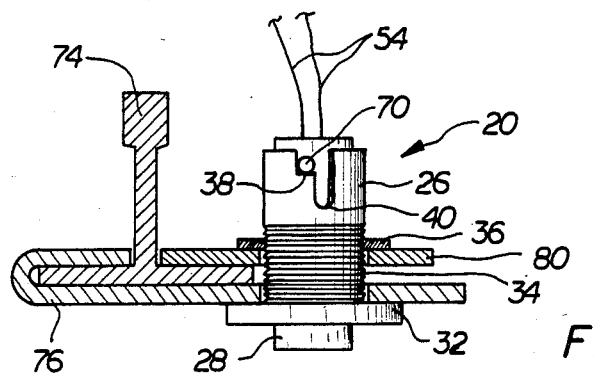
FIG.6
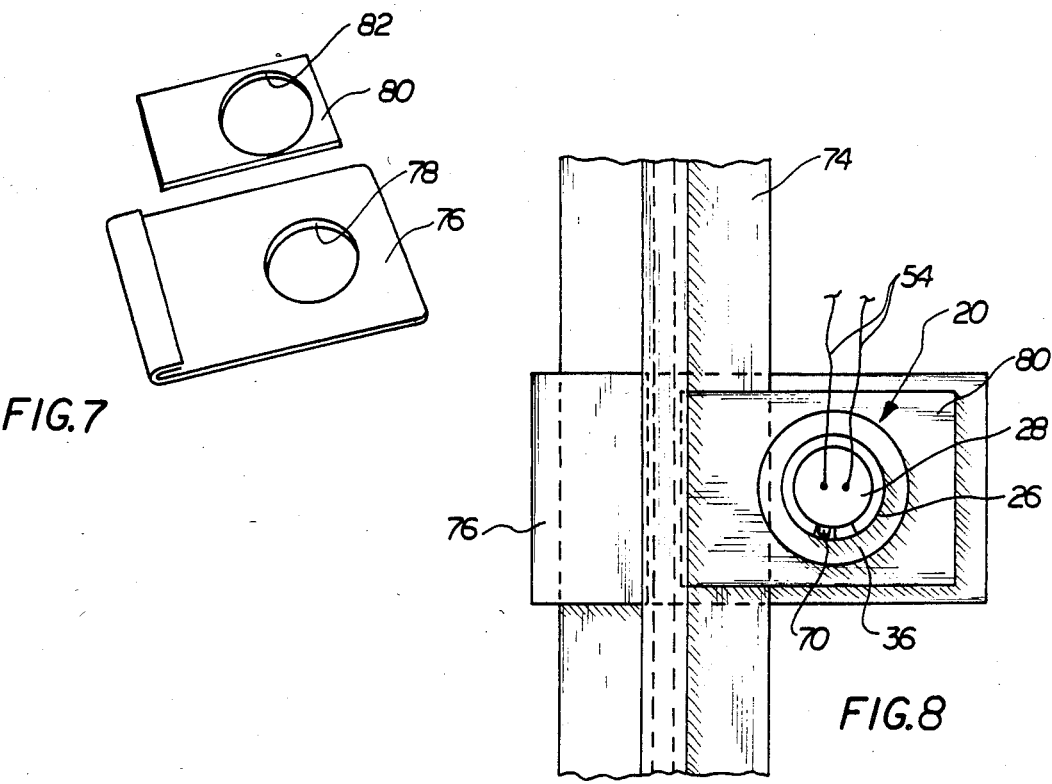
FIG.7
FIG.8

AMBIENT LIGHTING DETECTION MECHANISM

BACKGROUND OF THE INVENTION

The present invention is related generally to an apparatus for detecting ambient lighting levels within a given area and, more particularly, to a system and method for controlling the lighting level of gas discharge lamps through the use of the detected ambient level of the light in the immediate vicinity of the lamps.

The use of photocell arrangement to detect the presence and/or intensity of light within a given area to control the energization of the light is well known in the art. Generally, the photocell is connected in a feedback loop of the circuitry, to cause increased or decreased energization of the lamp, and provide a stable or predetermined level of lighting output from the system. Examples of lighting systems incorporating such a photocell are shown by U.S. patent application Ser. No. 286,770 filed July 27, 1981, now U.S. Pat. No. 4,464,610, entitled Modular Lighting Control with Circulating Inductor; Ser. No. 309,260 filed Oct. 7, 1981, now U.S. Pat. No. 4,463,287, entitled Four Lamp Modular Lighting Control; Ser. No. 338,340 filed Jan. 11, 1982, now abandoned, entitled Magnetic Ballast with Thyristor Control; and Ser. No. 443,243 filed Nov. 22, 1982, now U.S. Pat. No. 4,437,043, entitled Lighting Control for High Intensity Discharge Lamp, all of which are assigned to the same assignee as the present application. Other manufacturers have also devised systems for detecting lighting intensity within a given area for use within an electrical circuit to control electrical power to a lighting system.

This invention is concerned with the mounting of a photocell arrangement for ready access to light in the immediate vicinity of the lighting system, and a particular construction of the photocell arrangement providing for ease of adjustment of the amount of light impinging upon the pohotocell.

SUMMARY OF THE INVENTION

The present invention provides a mounting arrangement for a photocell in the immediate vicinity of the lighting system to enable detection of ambient lighting by the photocell within the area. Mounting of the photocell arrangement is arranged to minimize time, additional hardware, and installation equipment. This improvement and others is the result of an adjustable lighting level detection mechanism designed for ease of installation, adjustment and operation.

Efficient operation of the photocell is directly related to the ability of the device to pick up ambient lighting within the room for use in controlling the lighting provided by the fixture. The ability to change the sensitivity of the photocell detection means involves altering the field of view of the photocell by opening or closing the lens passage to the photocell.

BRIEF DESCRIPTION OF THE DRAWINGS

FIG. 6 is a partial cross-sectional view of an alternate embodiment for mounting the light detector of the present invention;

FIG. 7 is an exploded perspective view of the mounting hardware used in the embodiment shown in FIG. 6; and, FIG. 8 is a plan view of the embodiment and detector shown in FIG. 6.

DETAILED DESCRIPTION OF THE PREFERRED EMBODIMENTS

Figure 1:
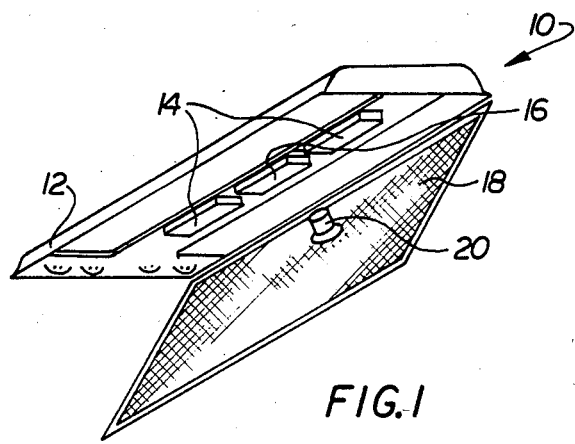
FIG. 1 is a perspective view of a fluorescent lighting fixture including a light detector constructed in accordance with the present invention.

A four lamp fluorescent fixture 10 is shown in FIG. 1 including a modular lighting control system such as shown in U.S. patent application Ser. No. 309,260 filed Oct. 7, 1981. This application is assigned to the same assignee as the present application. While the fluorescent bulbs are not shown in the fixture of FIG. 1, the base structure 12 includes dual ballasts 14 mounted therein and a control circuit 16 such as that shown in the above-identified U.S. application. Base 12 is provided with a diffuser 18 mounted on a hinge at one edge (not shown) and having a latch at the other edge (now shown). A lighting level detector 20 is shown mounted within diffuser 18 of the lamp and is electrically connected to control circuit 16, as further explained in the above-identified U.S. patent application.

Figure 2:
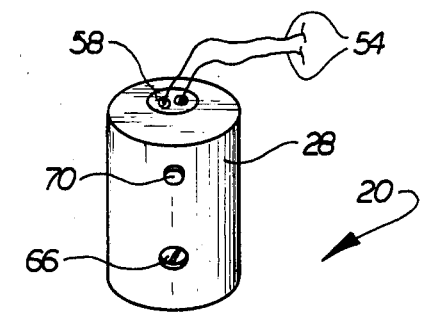
FIG. 2 is an exploded view of the light detector of the present invention.
Figure 3:
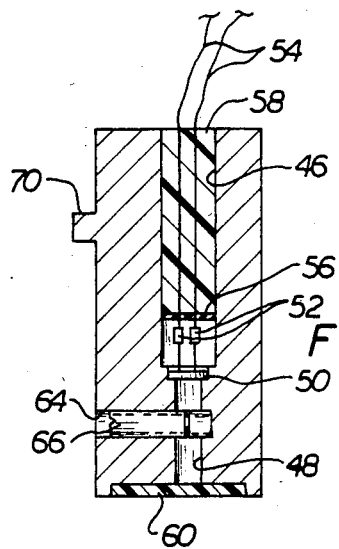
FIG. 3 is a cross-sectional view of a body member of the light detector.
Figure 4:
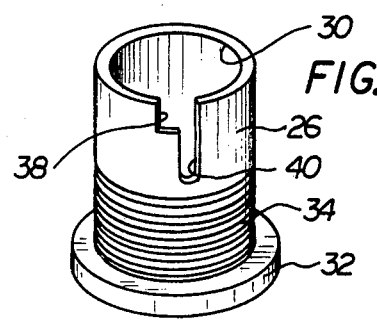
FIG. 4 is a perspective view of a portion of the light in FIG. 1 illustrating the mounting of the light detector.

The details of detector 20 may be understood with the aid of FIG. 2 wherein the major components of the light detector are shown in an exploded view. Detector 20 includes a collar 26 and a body 28. Collar 26 has a cylindrical opening 30 therethrough into which body 28 fits in a sliding relationship. An external flange 32 is provided as an integral portion of collar 26 near one edge thereof and external threads 34 are provided on the surface of the collar at the end near flange 32. As can be seen in FIG. 4, detector 20 is mounted within a surface such as diffuser 18 by providing an opening through the surface large enough for collar 26 but not flange 32. With the collar 26 extending through the surface, flange 32 abuts one face of the surface while a threaded nut 36 secured by threads 34 engages the other face. Collar 26 further includes first and second slots 38 and 40 within the surface of the collar extending axially from the edge opposite flange 32. The purpose of these slots will be more readily understood with the aid of material and figures to be explained hereinafter.

Body 28 slidingly engages the inner surface of collar 26, and may be constructed of any one of a number of materials. Plastic is the preferred material for the body due to the relative ease in working with the material as well as the electrical insulation abilities. The body has a generally cylindrical shape with concentric apertures 46 and 48 extending axially therethrough. While the apertures are in an axial direction, they need not be concentric with the center of body 28, but only concentric with one another. A photocell 50 is positioned near the juncture of the two concentric apertures. Electrical connections 52 are made between photocell 50 and a pair of electrical leads 54 near the lower end of aperture 46. A plug 56 is inserted into aperture 46 near electrical connections 52 and the balance of aperture 46 is filled with an epoxy material 58 to seal the photocell and its connections within the body. At the lower end of body 28 a diffuser 60, constructed of glass or plastic, closes the end of aperture 48. Diffuser 60 operates to focus light into aperture 48 and thus onto photocell 50.

An aperture 64 extends radially into body 28 and intersects aperture 48. The surface of aperture 64 is threaded to matingly engage a set screw 66. By turning set screw 66 either further into aperture 64 or out of the aperture, the amount of light directed into aperture 48 and at the photocell may be adjusted. In this way, the sensitivity of the photocell and thus the detector may be adjusted by appropriate movement of set screw 66.

Figure 5A:
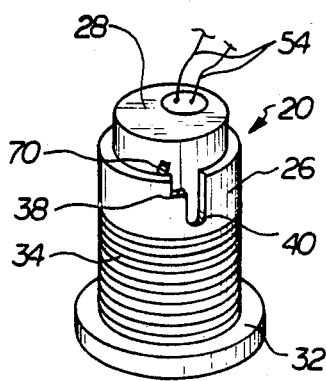
FIG. 5a, 5b and 5c are perspective views of the light detector of the present invention illustrating three operating positions for the body of the detector.
Figure 5B:
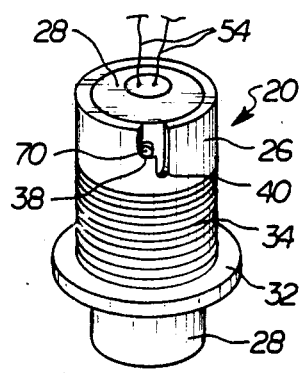
Figure 5C:
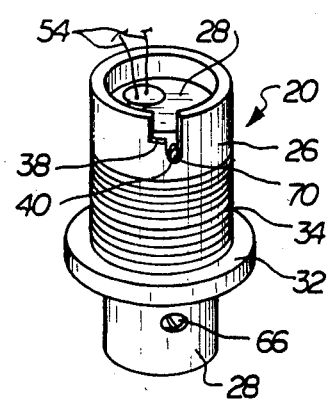

The outer surface of body 28 includes a lug 70, the purpose of which may be understood with the aid of FIGS. 5a through 5c. FIG. 5a illustrates a first operational position for detector 20 wherein body 28 does not extend below collar 26. This position is maintained as a result of lug 70 resting on the top edge of collar 26. In this position, diffuser 60 is essentially flush with the outer surface of collar 26 and directs light into aperture 48 and the photocell.

By allowing the body to rotate slightly thus dropping lug 70 into slot 38, the relative positions of body 28 and collar 26 change as shown in FIG. 5b. In this alternate operational position, body 28 and thus diffuser 60 are at a position below the lower edge of the collar. This alternate position is the preferred operational position for the detector and allows preset light entry through diffuser 60 and onto photocell 50.

FIG. 5c illustrates detection device 20 in a photocell setting position wherein lug 70 has been positioned into slot 40 to allow body 28 to extend sufficiently to expose set screw 66. In this position, the amount of light impinging upon photocell 50 is adjusted as noted above by turning the set screw until the appropriate position has been reached. Once the adjustment is complete, body 28 should be returned to either the first or second operating positions shown in FIGS. 5a and 5b, respectively.

An alternate method of securing detection device 20 for operation is shown in FIG. 6. Fluorescent lighting fixtures with which the detection device is used are generally mounted within a suspended ceiling. These suspended ceilings are supported by T-bars 74, one of which is shown in FIG. 6. The design of the T-bars is relatively conventional and is manufactured by a number of concerns such as Donn Corporation. Rather than mount detection device 20 within the diffuser of lighting fixture 10, the device may be attached to one of the T-bars supporting the ceiling. A first mounting plate 76 has an overturned edge designed to engage the horizontal flange of T-bar 74. The surface of plate 76 has an aperture 78 therethrough of sufficient diameter to allow passage of collar 26 of the detector. A second plate 80 likewise has an aperture 82 of sufficient size to allow passage of collar 26 therethrough.

First and second plates 76 and 80 are arranged with T-bar 74 and detection device 20 as shown in FIGS. 6 and 8. Collar 26 is passed through aperture 78 of plate 76 such that flange 32 engages the face of the first plate. Second plate 80 is positioned over the collar and nut 36 is threaded onto threads 34 to bind plates 76 and 80 to the T-bar.

Considerable emphasis has been placed on the preferred embodiments of the invention and the specific structures of the component parts thereof. While many changes can be made in the embodiments herein illustrated and described without departing from the principle of the invention, it should be distinctly understood that the foregoing descriptive matter is to be interpreted as merely illustrative of the invention and not as a limitation.

What is claimed is:

1. A mounting apparatus for an ambient lighting detection photocell including in combination, a collar member having a peripheral flange near one end for engaging a mounting surface and binding means for locking said collar to said mounting surface, a body member slidingly positioned within said collar, said body member having an aperture with a photocell positioned adacent thereto, aperture adjustment means for regulating the amount of light entering said aperture, and retainer means for temporarily fixing the relative positions of the body member and collar member in one of a plurality of operational positions.

2. The apparatus according to claim 1 wherein said binding means includes external threads on at least a portion of the outer surface of said collar and a threaded nut engaging said external threads.

3. A method of detecting an ambient lighting level in a given area with a lighting level detection means comprising the steps of:
   providing a body member of said detection means mounted within the given area,
   mounting a photocell adacent an aperture in said body member,
   directing the light into said aperture and onto said photocell with a diffuser means,
   regulating the amount of light reaching said photocell through an aperture adjustment means, and
   supporting said body member within a collar member providing at least one operational position for said body member.

4. The method according to claim 3 in which supporting said body member includes, temporarily fixing the relative positions of the body member and the collar member with a retainer means.

* * * * *